(12) United States Patent
Kawaguchi

(10) Patent No.: US 11,526,309 B2
(45) Date of Patent: Dec. 13, 2022

(54) COMPUTER-READABLE MEDIUM, INFORMATION PROCESSING DEVICE, AND METHOD FOR PERFORMING ECO-PRINTING

(71) Applicant: Brother Kogyo Kabushiki Kaisha, Nagoya (JP)

(72) Inventor: Masafumi Kawaguchi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/327,968

(22) Filed: May 24, 2021

(65) Prior Publication Data

US 2021/0382668 A1 Dec. 9, 2021

(30) Foreign Application Priority Data

Jun. 5, 2020 (JP) .............................. JP2020-098198

(51) Int. Cl.
*G06F 3/12* (2006.01)
*H04N 1/23* (2006.01)

(52) U.S. Cl.
CPC .......... *G06F 3/1219* (2013.01); *G06F 3/1204* (2013.01); *G06F 3/1221* (2013.01); *G06F 3/1254* (2013.01); *H04N 1/2369* (2013.01)

(58) Field of Classification Search
CPC .... G06F 3/1219; G06F 3/1204; G06F 3/1221; G06F 3/1254; H04N 1/2369
USPC ........................................................ 358/1.13
See application file for complete search history.

(56) References Cited

U.S. PATENT DOCUMENTS

| | | | |
|---|---|---|---|
| 8,917,407 B2* | 12/2014 | Yasui .................... | G06F 3/1253 358/1.14 |
| 10,409,532 B2* | 9/2019 | Akimoto ............... | G06F 3/1221 |
| 11,036,441 B1* | 6/2021 | Kodimer ............... | G06F 3/1253 |
| 2014/0078534 A1* | 3/2014 | Oda ....................... | G06F 3/1219 358/1.15 |
| 2015/0098107 A1* | 4/2015 | Yagi ...................... | G06F 3/1231 358/1.15 |
| 2015/0371118 A1* | 12/2015 | Lin ....................... | G06F 3/1285 358/1.15 |
| 2019/0317709 A1* | 10/2019 | Sugimoto ............. | G06F 3/1288 |

FOREIGN PATENT DOCUMENTS

JP 2019-207365 A 12/2019

\* cited by examiner

*Primary Examiner* — Allen H Nguyen
(74) *Attorney, Agent, or Firm* — Burr & Brown, PLLC

(57) ABSTRACT

A non-transitory computer-readable medium stores computer-readable instructions executable by a processor of an information processing device including a user interface. The instructions are configured to, when executed by the processor, cause the information processing device to accept via the user interface an operation for performing eco-printing, obtain related information on a plurality of setting items for the eco-printing, and when accepting the operation for performing the eco-printing, automatically set print parameters for the plurality of setting items for the eco-printing, based on the obtained related information.

14 Claims, 12 Drawing Sheets

COMPUTER-READABLE MEDIUM, INFORMATION PROCESSING DEVICE, AND METHOD FOR PERFORMING ECO-PRINTING

CROSS-REFERENCE TO RELATED APPLICATION

This application claims priority under 35 U.S.C. § 119 from Japanese Patent Application No. 2020-098198 filed on Jun. 5, 2020. The entire subject matter of the application is incorporated herein by reference.

BACKGROUND

Technical Field

Aspects of the present disclosure are related to a computer-readable medium, an information processing device, and a method, for performing eco-printing.

Related Art

A technology to perform eco-printing has been known. The eco-printing is printing to reduce the consumption of consumables such as printing sheets and ink and reduce power consumption. In other words, the eco-printing is environmentally and economically friendly printing to reduce consumption costs.

SUMMARY

Aspects of the present disclosure are advantageous to provide one or more improved techniques to properly perform eco-printing.

According to aspects of the present disclosure, a non-transitory computer-readable medium is provided, which stores computer-readable instructions executable by a processor of an information processing device that includes a user interface. The instructions are configured to, when executed by the processor, cause the information processing device to accept via the user interface an operation for performing eco-printing, obtain related information on a plurality of setting items for the eco-printing, and when accepting the operation for performing the eco-printing, automatically set print parameters for the plurality of setting items for the eco-printing, based on the obtained related information.

According to aspects of the present disclosure, further provided is an information processing device that includes a user interface and a controller. The controller is configured to accept via the user interface an operation for performing eco-printing, obtain related information on a plurality of setting items for the eco-printing, and when accepting the operation for performing the eco-printing, automatically set print parameters for the plurality of setting items for the eco-printing, based on the obtained related information.

According to aspects of the present disclosure, further provided is a method implementable on a processor of an information processing device that includes a user interface. The method includes accepting via the user interface an operation for performing eco-printing, obtaining related information on a plurality of setting items for the eco-printing, and when accepting the operation for performing the eco-printing, automatically setting print parameters for the plurality of setting items for the eco-printing, based on the obtained related information.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings. The illustrative embodiment is merely an example concept according to aspects of the present disclosure. Aspects of the present disclosure are capable of changes or modifications within the scope of the inventive concept as expressed herein. For instance, an execution order of below-mentioned processes may be changed as necessary to such an extent that the change(s) are not beyond the scope of the inventive concept.

Figure 1:
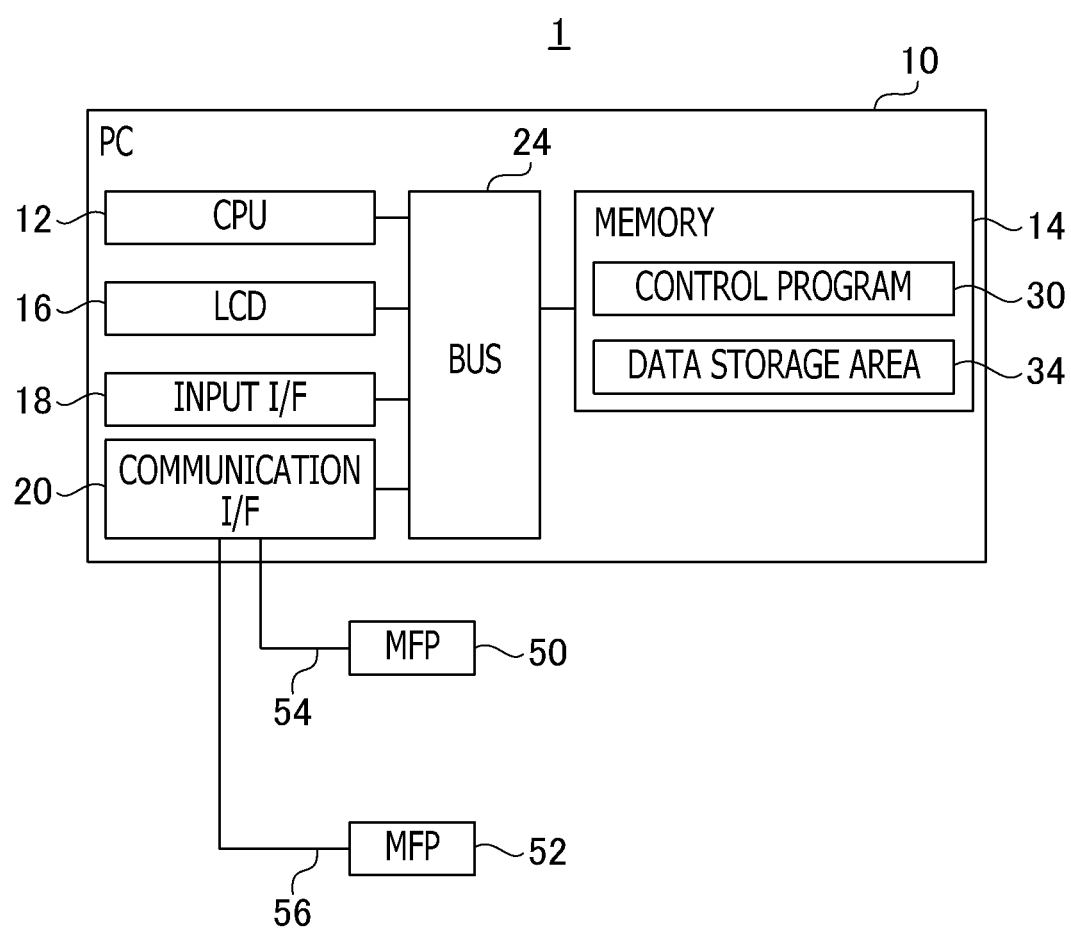
FIG. 1 is a block diagram of a communication system including a PC and multi-function peripherals (hereinafter referred to as "MFPs"), in an illustrative embodiment according to one or more aspects of the present disclosure.

FIG. 1 is a block diagram of a communication system 1 in the illustrative embodiment. The communication system 1 shown in FIG. 1 includes a PC 10 and MFPs ("MFP" is an abbreviation for "Multi-Function Peripheral") 50 and 52. Each of the MFPs 50 and 52 is configured to perform various processes such as a scanning process and a printing process. The MFP 50 has a duplex printing function, a color printing function, and a layout printing function as print processing functions. Meanwhile, the MFP 52 does not have the duplex printing function but has only the color printing function and the layout printing function as print processing functions. The layout printing is so-called N-in-1 printing to print a plurality of images laid out on each single printing sheet.

The PC 10 includes a CPU 12, a memory 14, an LCD 16, an input I/F ("I/F" is an abbreviation for "interface") 18, and a communication I/F 20. These elements included in the PC 10 are communicably interconnected via a bus 24.

The PC 10 is configured to communicate with the MFPs 50 and 52 via the communication I/F 20 and communication paths 54 and 56. Applicable communication methods for each of the communication paths 54 and 56 may include, but are not limited to, a wired LAN, USB, Wi-Fi (registered trademark) and Bluetooth.

The CPU 12 executes processing according to a control program 30 stored in the memory 14. The control program 30 is, for instance, an application program for causing the MFPs 50 and 52 to perform image forming processes such as printing processes. In the following description, the CPU 12 executing the control program 30 may be simply referred to as the name of the control program 30. Specifically, for instance, "the control program 30" in the following description may denote "the CPU 12 executing the control program 30."

The memory 14 has a data storage area 34. The data storage area 34 is an area to store data necessary for execution of the control program. The memory 14 may include at least two of a RAM, a ROM, a flash memory, an HDD, a portable storage medium such as a USB memory detachably attached to the PC 10, and a buffer of the CPU 12.

The memory 14 may include a non-transitory computer-readable storage medium. Examples of the non-transitory computer-readable storage medium may include, but are not limited to, storage media such as a CD-ROM and a DVD-ROM, as well as the aforementioned storage devices. The non-transitory computer-readable storage medium is also a tangible medium. On the other hand, an electrical signal carrying a program downloaded from a server on the Internet is a computer-readable signal medium as a type of computer-readable medium, but is not included in the examples of the non-transitory computer-readable storage medium. It is noted that the CPU 12 and the memory 14 storing the control program 30 form a "controller" to control operations by the PC 10.

The LCD 16 is configured to display various kinds of information regarding the PC 10. It is noted that a "display" according to aspects of the present disclosure is not limited to an LCD, but may be another type of display such as an organic EL display. The input I/F 18 includes a keyboard and a mouse. The input I/F 18 is an interface configured to accept user input operations. The input I/F 18 may further include a film touch sensor superimposed on a display screen of the LCD 16.

In the following description, processing by the CPU 12 according to instructions described in programs will be basically shown. Namely, processes such as "judging," "extracting," "selecting," "calculating," "determining," "identifying," "obtaining," "accepting," "receiving," "controlling," and "setting" in the following description may represent processing by the CPU 12. The processing by the CPU 12 may include hardware control via an OS therefor. It is noted that "obtaining" may be used as a concept that does not necessarily require a request. Namely, for instance, a process of the CPU 12 receiving data without making a request may be included in a concept of "the CPU 12 obtains data." Further, "data" in the following description may be represented by a computer-readable bit string. Additionally, a plurality of pieces of data having substantially the same meaning or content but expressed in different formats shall be treated as the same data. The same applies to "information" in the following description. Further, processes such as "instructing," "responding," and "requesting" may be performed by transmitting information representing "an instruction," "a response," and "a request," respectively. Further, the expressions such as "an instruction," "a response," and "a request," may be used to denote information itself that represents "the instruction," "the response," and "the request," respectively. Further, a process of a CPU determining whether or not the information A represents that it is the matter B may be conceptually described as "determining from the information A whether or not it is the matter B." Furthermore, a process of a CPU determining whether the information A represents that it is the matter B or the matter C may be conceptually described as "determining from the information A whether it is the matter B or the matter C."

In the communication system 1 configured as above, a device to perform an image forming process (e.g., a printing process) is selected on the PC 10, and an image forming instruction (e.g., a print instruction) is transmitted to the selected device. Thereby, the image forming process is performed by the selected device. In this case, for instance, before the printing process is performed, target image(s) to be printed are selected on the PC 10, and setting values are set for various setting items for the printing process. Thereby, image data of the target image(s) and information regarding the setting values set for the various setting items are transmitted to the selected device. Thus, the printing process is performed to print the target image(s) by the selected device in accordance with the setting values set for the various setting items. Further, on the PC 10, an eco-printing process may be specified as the printing process. When the eco-printing process is specified, print parameters for a plurality of setting items for performing the eco-printing process are automatically set according to a type of the target image(s) and function(s) executable by the selected device. Hereinafter, referring to FIGS. 2 to 4, a detailed explanation will be provided of a process to be performed by the CPU 12 executing the control program 30 to cause the selected device to perform the eco-printing process.

Figure 5:
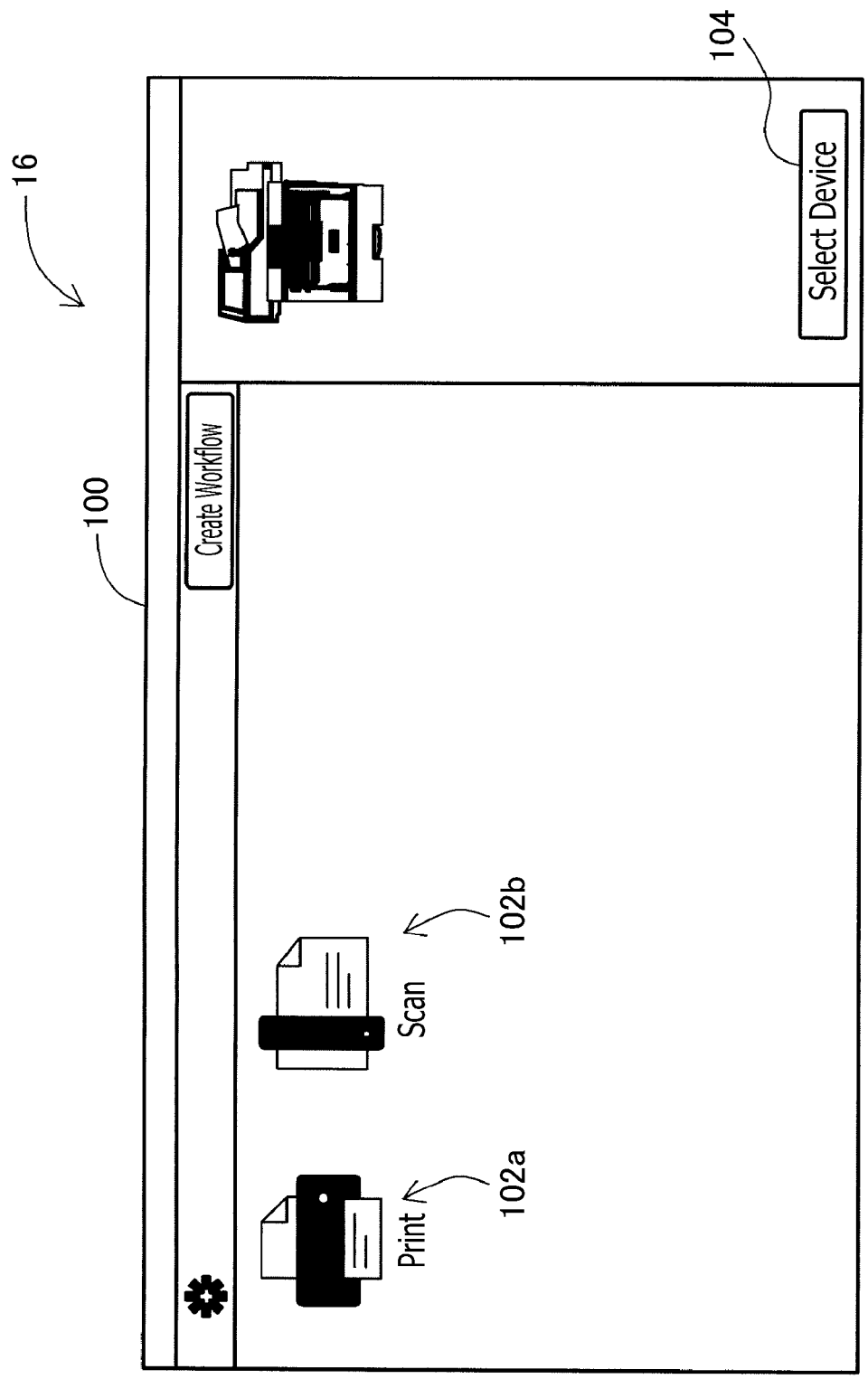
FIG. 5 shows an example of a home screen displayed on an LCD of the PC, in the illustrative embodiment according to one or more aspects of the present disclosure.

First, the control program 30 (more exactly, the CPU 12 executing the control program 30) displays a home screen 100 as shown in FIG. 5 on the LCD 16 (S100). The home screen 100 displays thereon icons 102 corresponding to image processing executable by the selected device. More specifically, for instance, when the MFP 50 is specified as the selected device, the home screen 100 displays thereon an icon 102a for causing the MFP 50 to perform the printing process and an icon 102b for causing the MFP 50 to perform the scanning process. In addition, the home screen 100 displays thereon a device selection button 104 for specifying the selected device. Therefore, by operating the device selection button 104, the user is allowed to specify one of selectable devices as the selected device. More specifically, for instance, when the MFP 50 is specified by default as the selected device, the selected device may be changed from the MFP 50 to the MFP 52 by operating the device selection button 104.

Further, the control program 30 obtains, from the selected device, information (hereinafter referred to as "function information") regarding the function(s) of the selected device (S102). Specifically, for instance, when the MFP 50 is specified as the selected device, the control program 30 obtains, from the MFP 50, the function information indicating the duplex printing function, the color printing function, and the layout printing function. Further, for instance, when the MFP 52 is specified as the selected device, the control program 30 obtains, from the MFP 52, the function information indicating the color printing function and the layout printing function.

Figure 6:
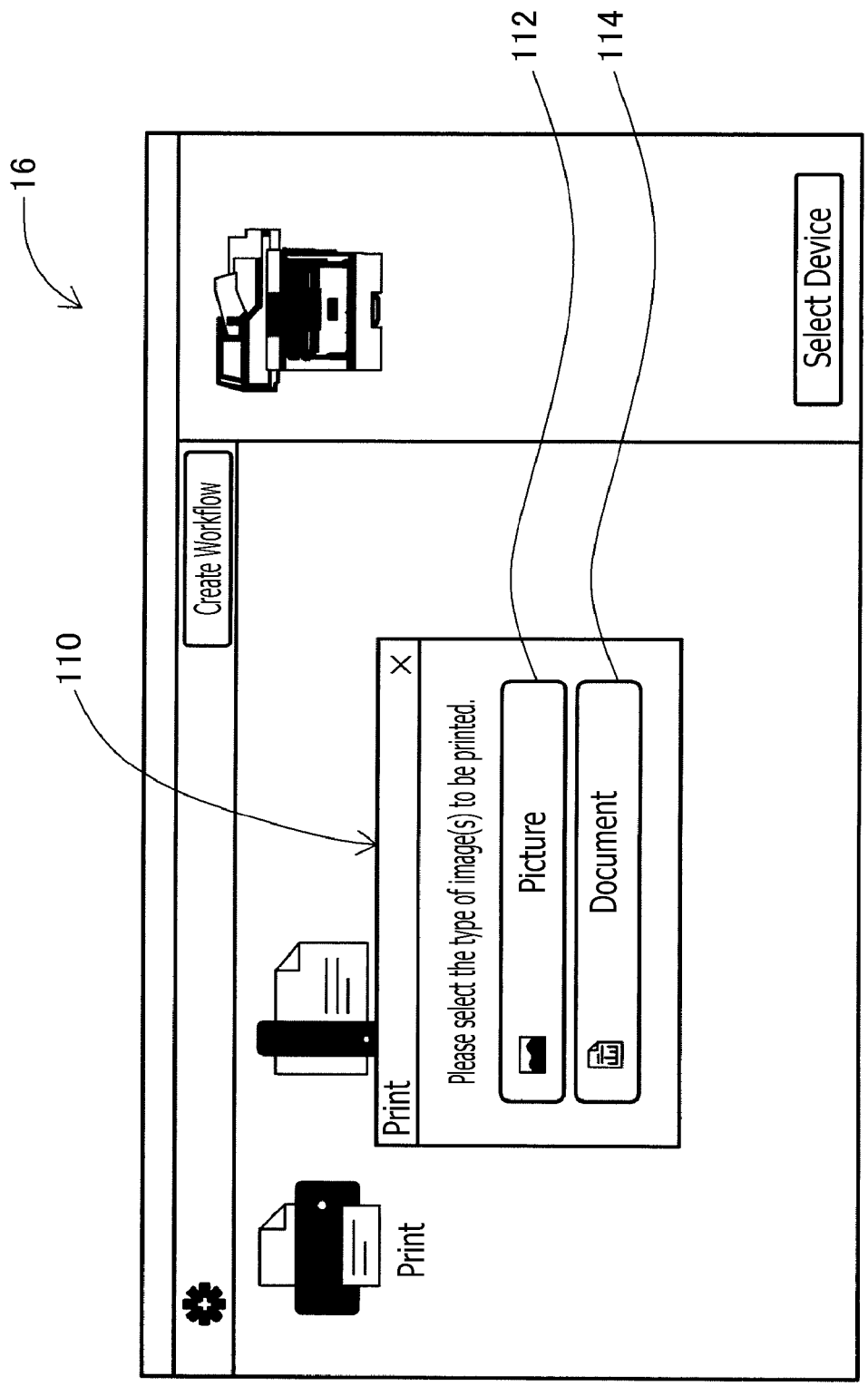
FIG. 6 shows an example of an image type selection screen displayed on the LCD, in the illustrative embodiment according to one or more aspects of the present disclosure.

Next, for instance, when the icon 102a is operated on the home screen 100, the control program 30 displays an image type selection screen 110 (see FIG. 6) on the LCD 16 (S104). The image type selection screen 110 is a screen for selecting the type of the target image(s) to be printed. The image type selection screen 110 displays thereon a picture selection button 112 for selecting a picture image as the type of the target image(s), and a document selection button 114 for selecting a document image as the type of the target image(s). Examples of the document image may include, but are not limited to, an image of a document. Examples of the picture image may include, but are not limited to, a photo image and an illustration image.

Figure 7:
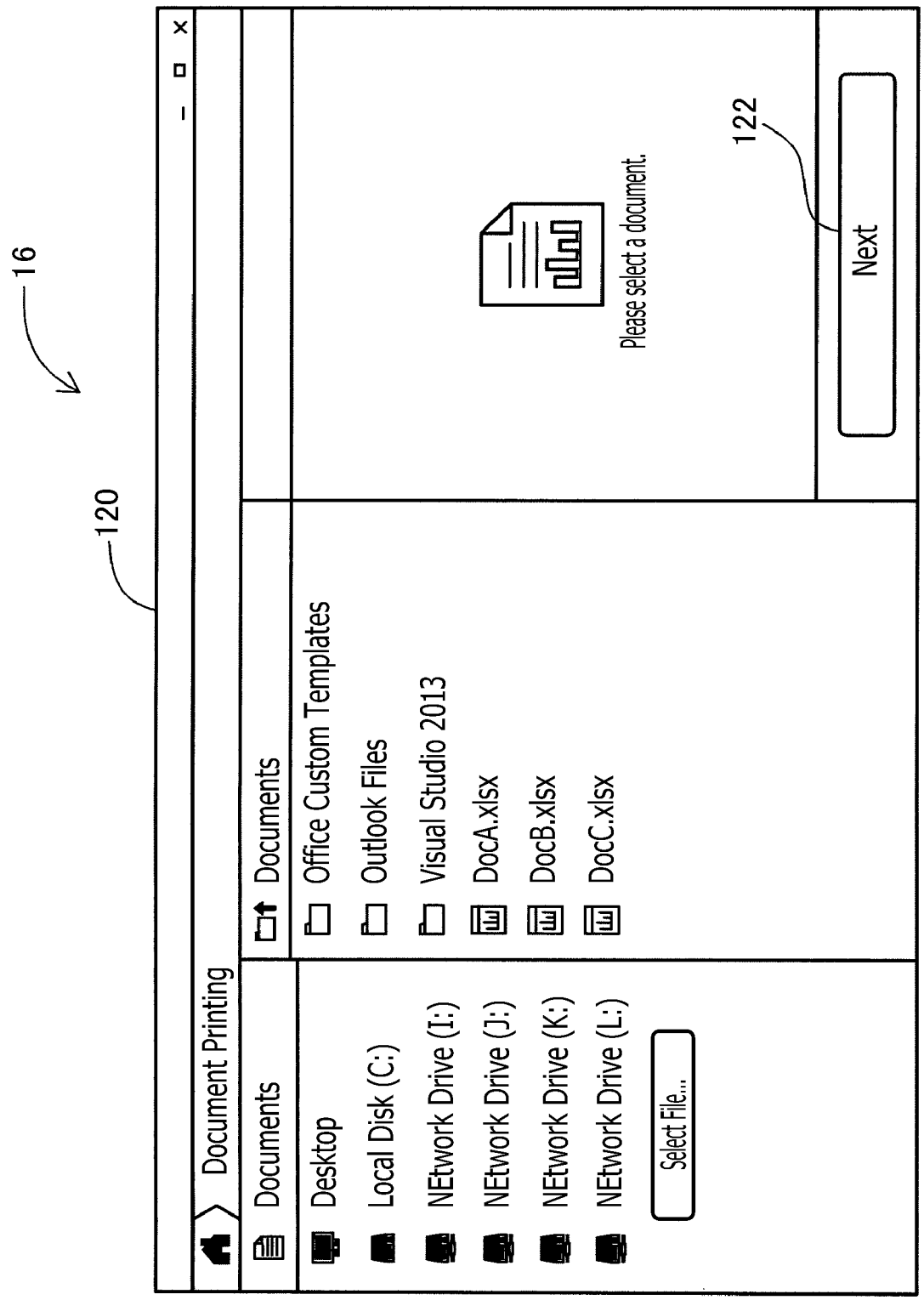
FIG. 7 shows an example of an image selection screen displayed on the LCD, in the illustrative embodiment according to one or more aspects of the present disclosure.
Figure 8:
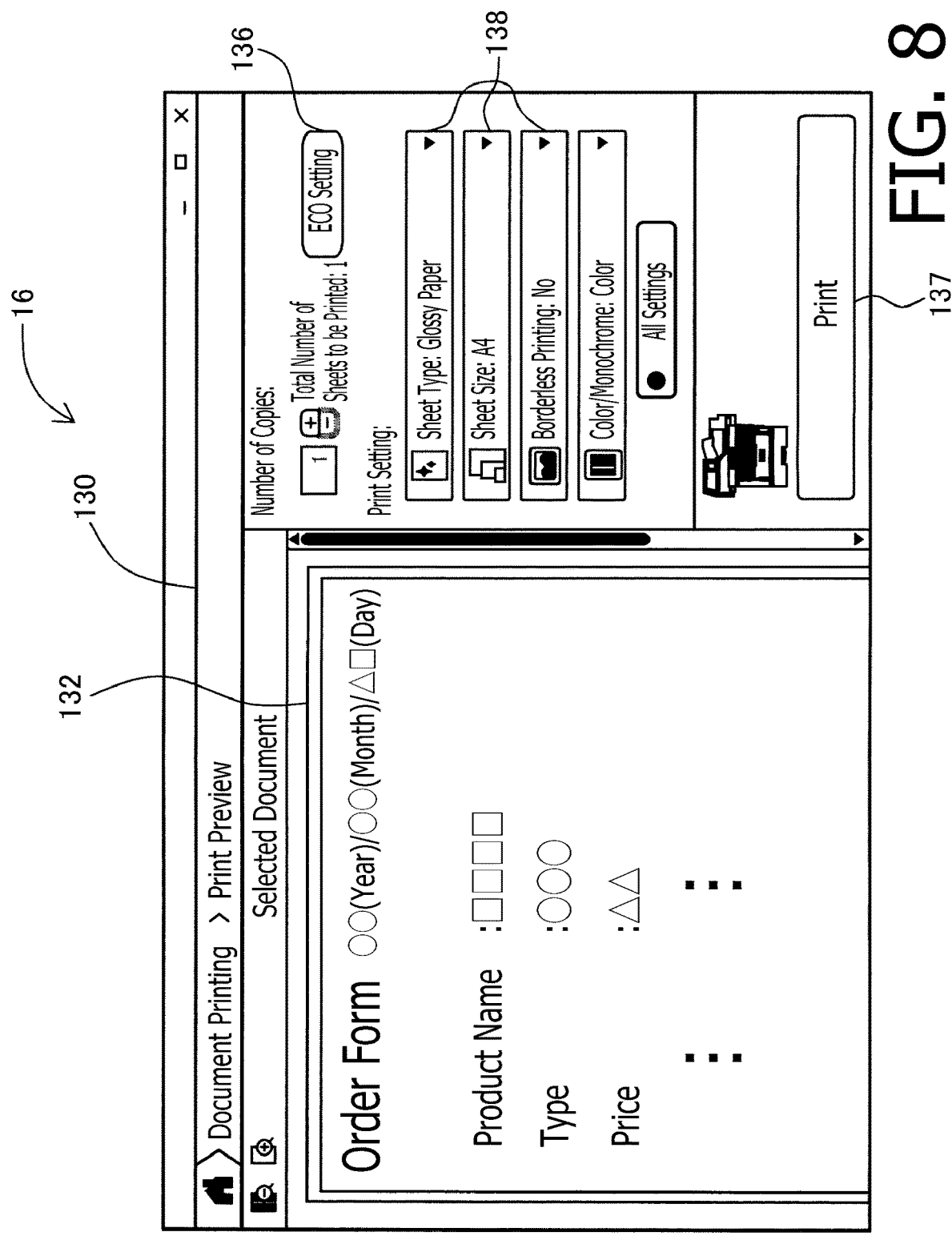
FIG. 8 shows an example of a print execution screen displayed on the LCD when a type of target image(s) to be printed is a document image, in the illustrative embodiment according to one or more aspects of the present disclosure.

Then, when one of the picture selection button 112 and the document selection button 114 is operated on the image type selection screen 110, the control program 30 stores information (hereinafter referred to as "image type information") indicating the type of the image(s) selected as the target image(s) (S106). Specifically, for instance, when the document selection button 114 is operated, the control program 30 stores information indicating the document image, as the image type information. Then, as shown in FIG. 7, the control program 30 displays on the LCD 16 an image selection screen 120 for selecting document image(s) as the target image(s) (S108). The image selection screen 120 displays thereon a plurality of file names of files each storing image data of document image(s). When a file name is selected from among the plurality of file names displayed on the image selection screen 120, and image data stored in the file of the selected file name is selected, document image(s) corresponding to the selected image data are determined as the target image(s) to be printed. Then, when a "Next" button 122 is operated on the image selection screen 120, the control program 30 displays on the LCD 16 a print execution screen 130 as shown in FIG. 8 (S110). On the print execution screen 130, a preview screen 132 is displayed. On the preview screen 132, the document image(s) selected via the image selection screen 120 are displayed.

Figure 9:
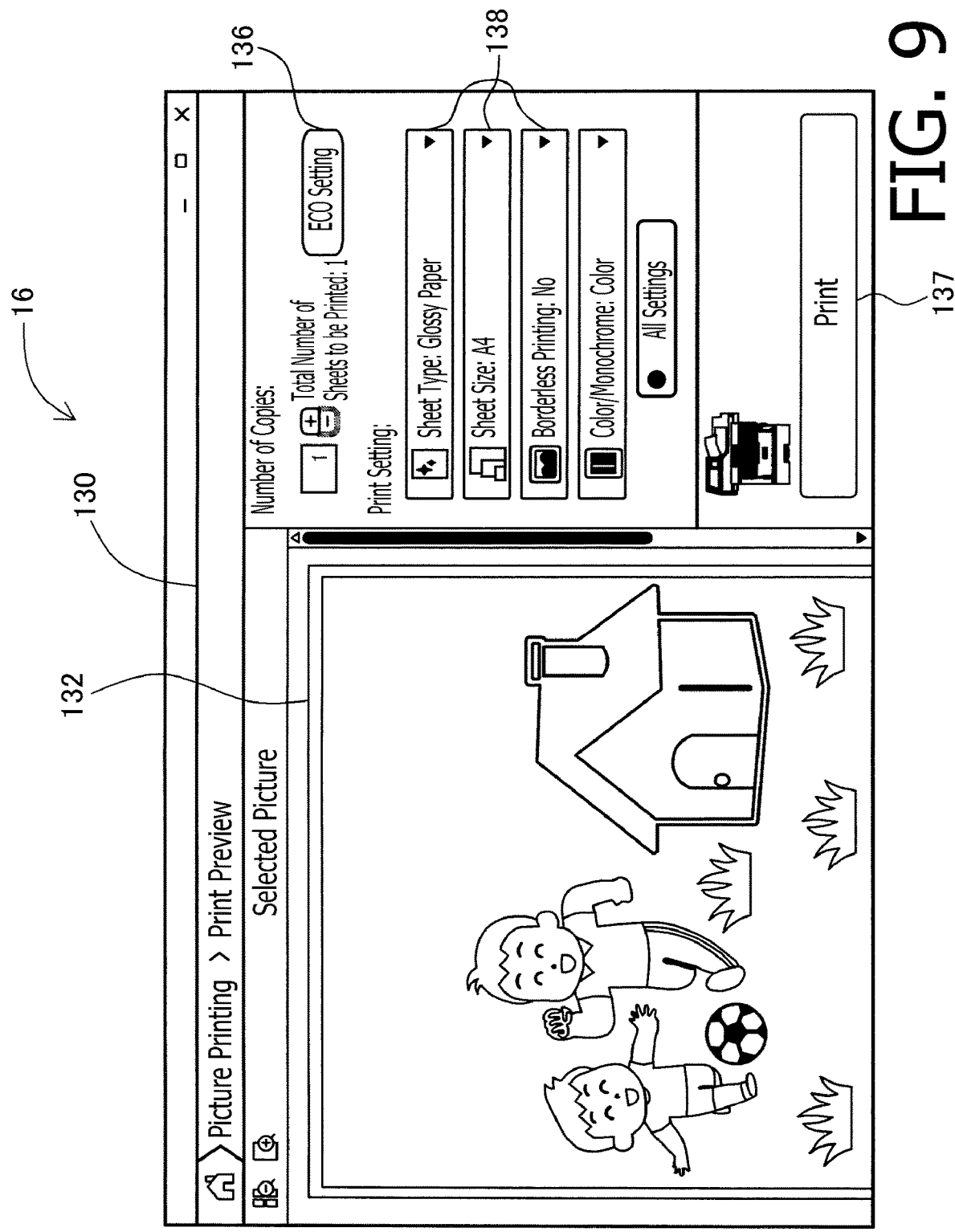
FIG. 9 shows an example of the print execution screen displayed on the LCD when the type of the target image(s) is a picture image, in the illustrative embodiment according to one or more aspects of the present disclosure.

Further, for instance, when the picture selection button 112 is operated on the image type selection screen 110, the control program 30 stores information indicating the picture image, as the picture type information. Then, the control program 30 displays on the LCD 16 an image selection screen (not shown) for selecting picture image(s) as the target image(s) (S108). The image selection screen displays thereon a plurality of file names of files each storing image data of picture image(s). When a file name is selected from among the plurality of file names displayed on the image selection screen, and image data stored in the file of the selected file name is selected, picture images corresponding to the selected image data are determined as the target image(s) to be printed. Then, when a "Next" button is operated on the image selection screen, the control program 30 displays on the LCD 16 the print execution screen 130 as shown in FIG. 9 (S110). The picture image(s) selected via the image selection screen are displayed on the preview screen 132 of the print execution screen 130 shown in FIG. 9.

On the print execution screen 130 displayed on the LCD 16, an eco setting button 136 is displayed. The eco-setting button 136 is a button for specifying an eco-printing process. When the eco-setting button 136 is operated, print parameters for a plurality of setting items for performing the eco-printing process are automatically set based on the function information obtained in S102 and the image type information stored in S106. It is noted that the eco-printing process is a printing process to reduce the consumption of consumables such as printing sheets and ink and reduce the power consumption. In other words, the eco-printing process is an environmentally and economically friendly printing process to reduce consumption costs.

When the eco setting button 136 is operated to specify the eco-printing process (S112: Yes), the control program 30 determines whether the document image is selected as the type of the target image(s), based on the image type information stored in S106 (S114). When determining that the document image is selected as the type of the target image(s) (S114: Yes), that is, when the eco setting button 136 is operated on the print execution screen 130 shown in FIG. 8, the control program 30 determines whether the selected device has the duplex printing function, based on the function information obtained in S102 (S116).

At this time, for instance, when the selected device is the MFP 50, the control program 30 determines that the selected device has the duplex printing function (S116: Yes), and sets the print parameter for a setting item indicating printing surface(s), to duplex printing (S118). Then, the control program 30 proceeds to S120. Meanwhile, when the selected device is the MFP 52, the control program 30 determines that the selected device does not have the duplex printing function (S116: No), and sets the print parameter for the setting item indicating the printing surface(s) to simplex printing (S122). Then, the control program 30 proceeds to S120.

Next, the control program 30 sets the print parameter for a setting item indicating a print color, to monochrome printing (S120). Namely, when the document image is selected as the type of the target image(s), the control program 30 sets the print parameter for the setting item indicating the print color to monochrome printing. Subsequently, the control program 30 analyzes the document image(s) selected as the target image(s), and identifies information (hereinafter referred to as "size information") indicating size(s) of characters contained in the document image(s) (S123). Then, the control program 30 determines whether the size(s) of the characters indicated by the size information are equal to or larger than a set size (S124). When determining that the size(s) of the characters indicated by the size information are equal to or larger than the set size (S124: Yes), the control program 30 sets the print parameter for a setting item indicating an image layout, to layout printing (S126). Then, the control program 30 proceeds to S128.

In the illustrative embodiment, there are two types of layout printing, i.e., so-called 2-in-1 printing in which two images are laid out and printed on each single printing sheet, and so-called 4-in-1 printing in which four images are laid out and printed on each single printing sheet. One of the 2-in-1 printing and the 4-in-1 printing is selectively set depending on the size(s) of the characters contained in the document image. Specifically, when the size(s) of the characters contained in the document image are equal to or larger than the set size but smaller than a second set size that is larger than the said set size, the control program 30 sets the print parameter for the setting item indicating the image layout to the 2-in-1 printing. Meanwhile, when the size(s) of the characters contained in the document image is equal to or larger than the second set size, the control program 30 sets the print parameter for the setting item indicating the image layout to the 4-in-1 printing.

When determining in S124 that the size(s) of the characters contained in the document image is smaller than the set size (S124: No), the control program 30 does not set the print parameter for the setting item indicating the image layout to the layout printing, but sets the said print parameter to normal layout printing in which one image is laid out and printed on each single printing sheet (S127). Then, the control program 30 proceeds to S128.

Figure 10:
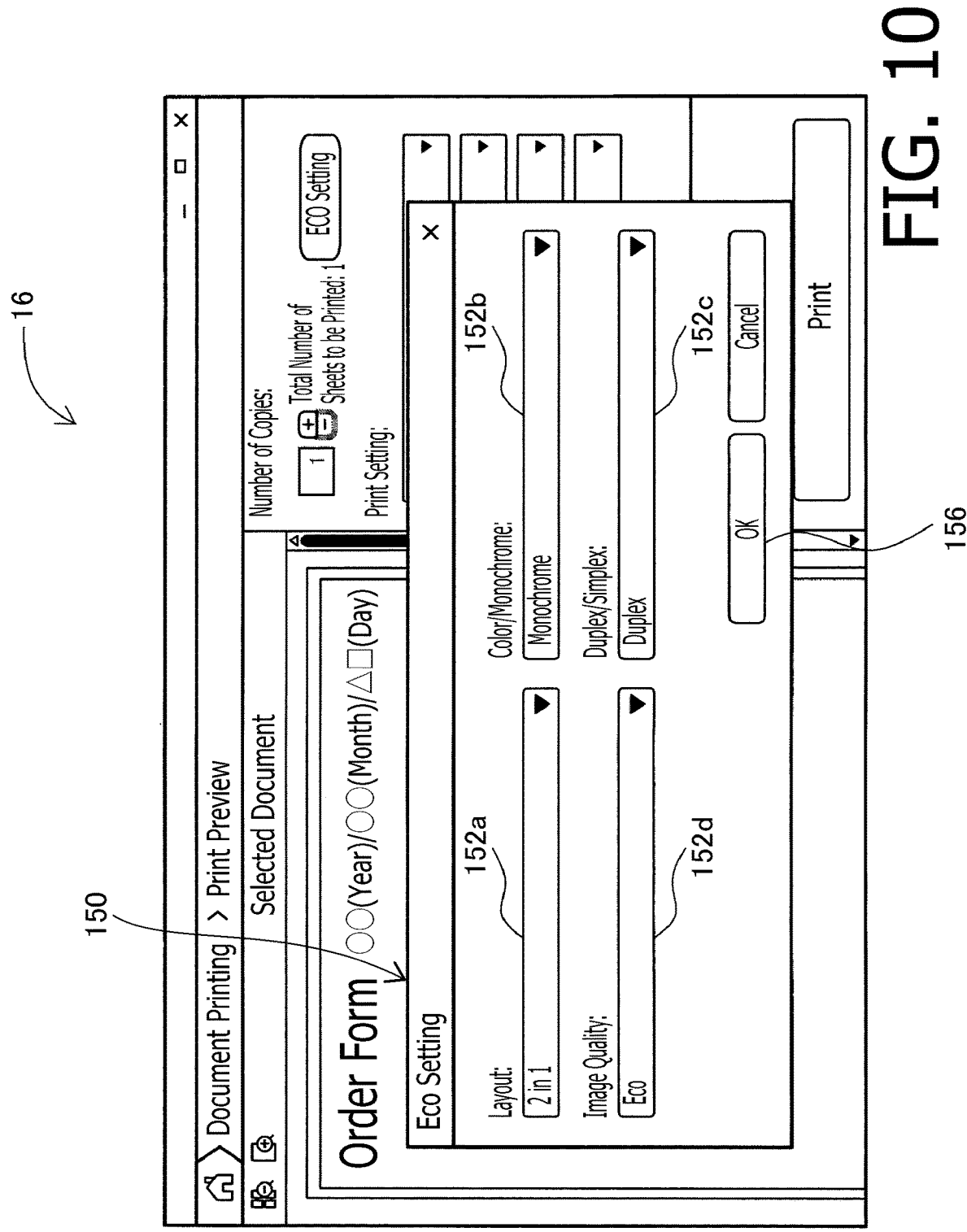
FIG. 10 shows an example of an eco setting screen displayed on the LCD when the type of the target image(s) is the document image, in the illustrative embodiment according to one or more aspects of the present disclosure.

Subsequently, the control program 30 displays on the LCD 16 an eco setting screen according to the set print parameters (S128). Specifically, the control program 30 displays an eco setting screen 150 shown in FIG. 10, for instance, when the layout printing (more specifically, the 2-in-1 printing) is set as the print parameter for the setting item indicating the image layout, the monochrome printing is set as the print parameter for the setting item indicating the print color, and the duplex printing is set as the print parameter for the setting item indicating the printing surface(s). The eco setting screen 150 shown in FIG. 10 displays thereon a layout setting field 152*a*, a print color setting field 152*b*, a printing surface setting field 152*c*, and an image quality setting field 152*d*. The layout setting field 152*a* is a setting field for setting the print parameter for the setting item indicating the image layout. In the layout setting field 152*a*, the layout printing (the 2-in-1 printing) is displayed as a default print parameter. The print color setting field 152*b* is a setting field for setting the print parameter for the setting item indicating the print color. In the print color setting field 152*b*, the monochrome printing is displayed as a default print parameter. The printing surface setting field 152*c* is a setting field for setting the print parameter for the setting item indicating the printing surface(s). In the printing surface setting field 152*c*, the duplex printing is displayed as a default print parameter. The image quality setting field 152*d* is a setting field for setting a print parameter for a setting item indicating image quality.

Figure 11:
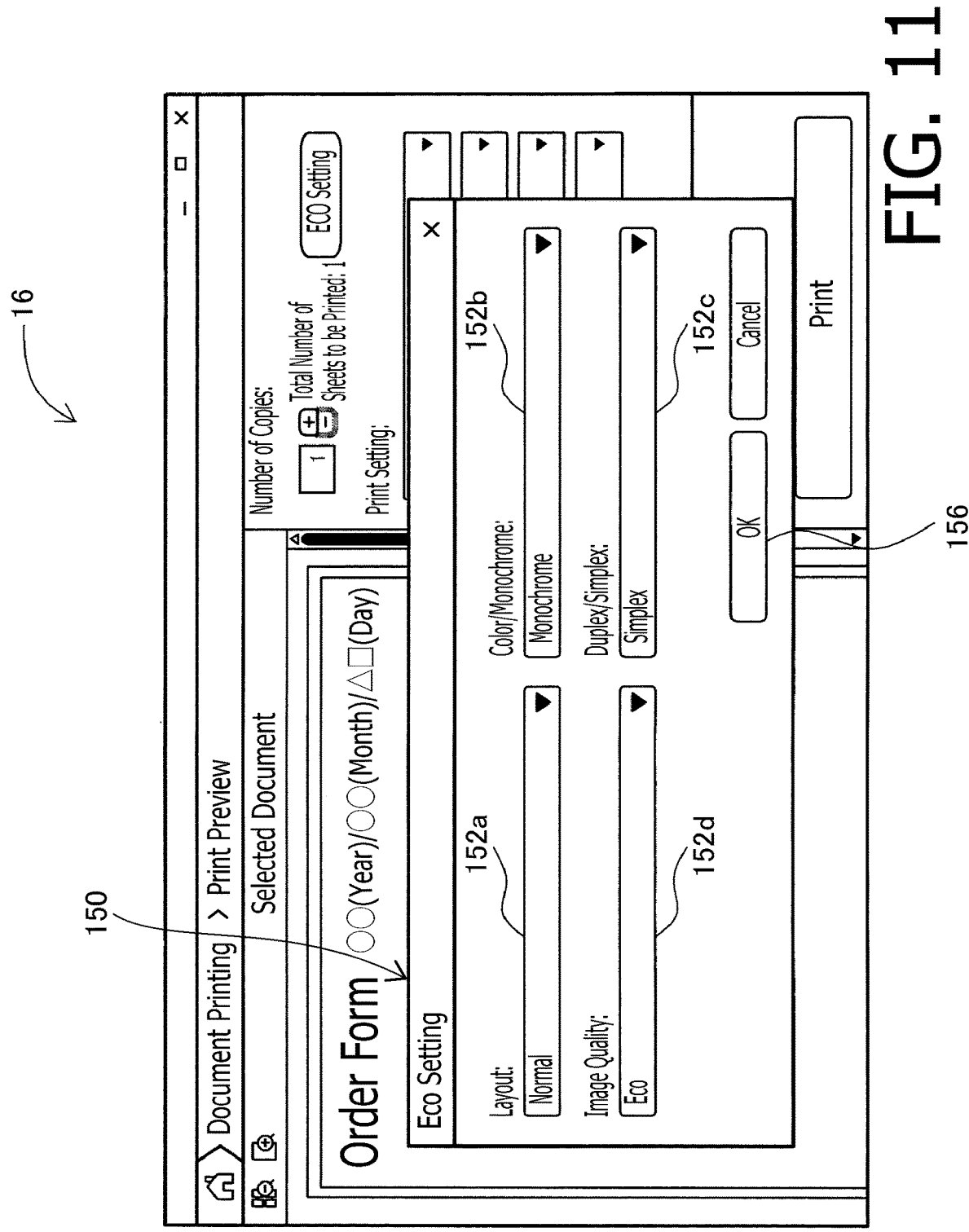
FIG. 11 shows another example of the eco setting screen displayed on the LCD when the type of the target image(s) is the document image, in the illustrative embodiment according to one or more aspects of the present disclosure.

Further, the control program 30 displays an eco setting screen 150 shown in FIG. 11, for instance, when the normal layout printing is set as the print parameter for the setting item indicating the image layout, the monochrome printing is set as the print parameter for the setting item indicating the print color, and the simplex printing is set as the print parameter for the setting item indicating the printing surface(s). On the eco setting screen 150 shown in FIG. 11, the normal layout printing is displayed as a default print parameter in the layout setting field 152*a*, the monochrome printing is displayed as a default print parameter in the print color setting field 152*b*, and the simplex printing is displayed as a default print parameter in the printing surface setting field 152*c*.

The image quality setting field 152*d* is used to set the image quality of an image to be printed on each printing sheet. The print parameter for the setting item indicating the image quality is set to one of "Normal" indicating normal image quality, "Fine" indicating high image quality, and "Eco" indicating low image quality. A larger amount of ink is consumed to print an image of higher image quality. Therefore, in the eco-printing process, "Eco" is displayed as the default print parameter in the image quality setting field 152*d*, regardless of the type of the target image(s) or the function(s) of the selected device.

As described above, when the type of the target image(s) is the document image, the print parameter for the setting item indicating the print color is automatically set to the monochrome printing. Then, when the selected device has the duplex printing function, the print parameter for the setting item indicating the printing surface(s) is set to the duplex printing. Meanwhile, when the selected device does not have the duplex printing function, the print parameter for the setting item indicating the printing surface(s) is set to the simplex printing. Furthermore, when the size(s) of the characters contained in the document image are equal to or larger than the set size, the print parameter for the setting item indicating the image layout is set to the layout printing such as the 2-in-1 printing or the 4-in-1 printing. Meanwhile, when the size(s) of the characters contained in the document image are smaller than the set size, the print parameter for the setting item indicating the image layout is set to the normal layout printing.

Figure 12:
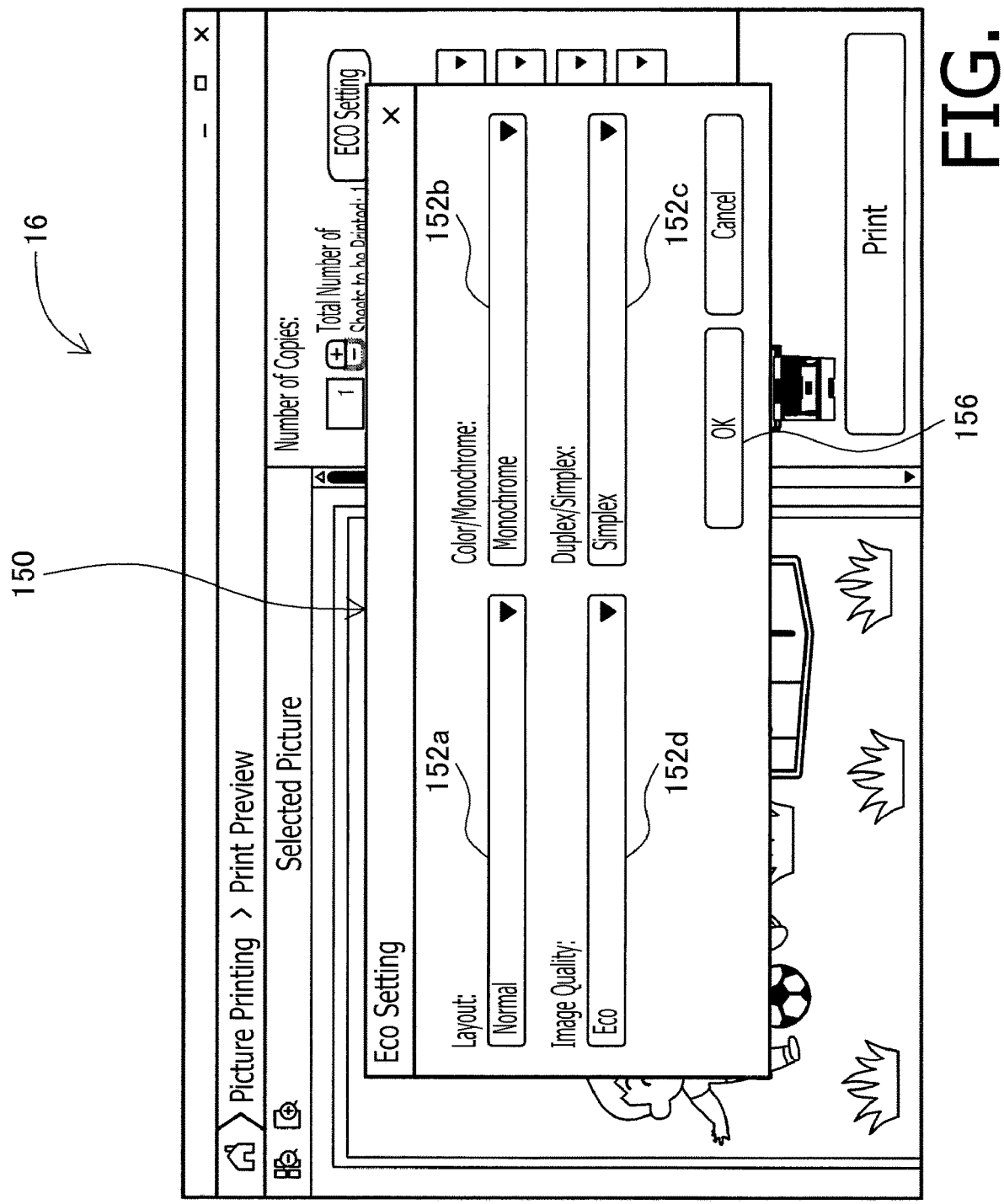
FIG. 12 shows an example of the eco setting screen displayed on the LCD when the type of the target image(s) is the picture image, in the illustrative embodiment according to one or more aspects of the present disclosure.

On the other hand, when the type of the target image(s) is not the document image (S114: No), that is, when the type of the target image(s) is the picture image, the control program 30 sets the print parameter for the setting item indicating the print color to the color printing, sets the print parameter for the setting item indicating the printing surface(s) to the simplex printing, and sets the print parameter for the setting item indicating the image layout to the normal layout printing (S130). Then, the control program 30 displays on the LCD 16 the eco setting screen corresponding to the set setting items (S128). Specifically, when the type of the target image(s) is the picture image, as shown in FIG. 12, on the eco setting screen 150, the normal layout printing is displayed as the default print parameter in the layout setting field 152*a*, the color printing is displayed as the default print parameter in the print color setting field 152*b*, and the simplex printing is displayed as the default print parameter in the printing surface setting field 152*c*. As shown in FIG. 12, it is noted that even when the type of the target image(s) is the picture image, "Eco" is displayed as the default print parameter in the image quality setting field 152*d* of the eco setting screen 150.

Thus, the print parameters of the plurality of setting items for performing the eco-printing process are automatically set according to the type of the target image(s), the function(s) of the selected device, and the automatically-set print parameters are displayed as the default print parameters on the eco setting screen 150. Thereby, for instance, the print parameter for the setting item indicating the print color may be set to the monochrome printing, thereby achieving a reduction in the consumption of color ink. Further, for instance, the print parameter for the setting item indicating the image layout may be set to the layout printing, thereby achieving a reduction in the consumption of printing sheets. Furthermore, for instance, the print parameter for the setting item indicating the printing surface(s) may be set to the duplex printing, thereby achieving a reduction in the consumption of printing sheets.

In addition, a pull-down button is displayed in each setting field. Hence, it is possible to change the print parameter displayed in each setting field, by operating a corresponding one of the pull-down buttons. Specifically, for instance, on the eco setting screen 150 shown in FIG. 12, it is possible to change the print parameter for the setting item indicating the print color, by operating the pull-down button in the print color setting field 152b. Thus, the user is allowed to change the print parameter for any setting item according to his or her intention.

When an OK button 156 is operated on the eco setting screen 150, the print parameter displayed in each setting field is set as the print parameter for the printing process to be performed. Namely, when the eco setting screen 150 is displayed on the LCD 16, and the user does not change any of the print parameters in the individual setting fields on the eco setting screen 150, the print parameters automatically set based on the type of the target image(s) and the function(s) of the selected device are set as the print parameters for the printing process to be performed. Meanwhile, when the user changes at least one of the print parameters in the individual setting fields on the eco setting screen 150, the print parameters, including the at least one print parameter changed according to the user's intention, are set as the print parameters for the printing process to be performed. Then, when a print button 137 is operated on the print execution screen 130 (S132: Yes), the control program 30 transmits, to the selected device, a print instruction including the print parameters set via the eco setting screen 150 and the image data of the target image(s) (S134). Thus, the eco-printing process according to the type of the target image(s) and the function(s) of the selected device or the eco-printing process according to the user's intention is performed by the selected device.

As shown in FIGS. 8 and 9, setting fields 138 for a plurality of setting items are displayed on the print execution screen 130. Thereby, it is possible to set arbitrary print parameters for the individual setting items of these setting fields by user operations. Hence, the user is allowed to operate each setting field 138 and set an arbitrary print parameter without operating the eco setting button 136 (S112: No). Then, when the print button 137 is operated (S132: Yes), the control program 30 transmits to the selected device a print instruction including the print parameters set by the user operations and the image data of the target image(s) (S134). Thus, a user-intended printing process is performed instead of the eco-printing process.

The aforementioned illustrative embodiment produces the following advantageous effects.

The control program 30 obtains the image type information indicating the type of the target image(s) and other information, as related information on the plurality of setting items for performing the eco-printing process. Then, when the eco setting button 136 is operated on the print execution screen 130, the control program 30 automatically sets the print parameters for those plurality of setting items based on the obtained related information. This makes it possible to automatically set the print parameters for the plurality of setting items for performing the eco-printing process simply by operating the eco setting button 136. Thus, it is possible to improve the operability for setting the print parameters concerning the eco-printing process.

Then, a print instruction, including the automatically-set print parameters and the image data of the target image(s), is transmitted to the selected device in response to an operation to the print button 137. Thereby, the eco-printing process according to the related information is performed by the selected device. Further, the automatically-set print parameters are displayed as default print parameters on the eco setting screen 150. On the eco setting screen 150, each of the print parameters displayed thereon may be changed by a user operation. Therefore, when at least one of the print parameters is changed on the eco setting screen 150, a print instruction, which includes the print parameters including the changed at least one print parameter, and the image data of the target image(s), is transmitted to the selected device in response to an operation to the print button 137. Thus, the user-intended eco-printing process is performed by the selected device.

The control program 30 obtains the image type information indicating the type of the target image(s), and automatically sets the print parameter for the setting item indicating the print color based on the image type information. Specifically, when the type of the target image(s) indicated by the image type information is the document image, the control program 30 automatically sets the print parameter for the setting item indicating the print color to monochrome printing. Thus, since the monochrome printing is set for printing of the document image, it is possible to reduce the consumption of color ink.

The control program 30 obtains the function information indicating the function(s) of the selected device, and automatically sets the print parameter for the setting item indicating the printing surface(s) based on the function information. Specifically, when the function(s) of the selected device indicated by the function information include the duplex printing function, the control program 30 automatically sets the print parameter for the setting item indicating the printing surface(s) to the duplex printing. Thus, since the duplex printing is set as printing by the selected device having the duplex printing function, it is possible to reduce the consumption of consumables such as printing sheets.

The control program 30 obtains feature information indicating features of the target image(s) to be printed, and automatically sets the printing parameter for the setting item indicating the image layout based on the feature information. Specifically, when the size(s) of the characters contained in the target image(s), as the features of the target image(s) indicated by the feature information, are equal to or larger than the set size, the control program 30 automatically sets the print parameter for the setting item indicating the image layout to the layout printing. Thus, since the layout printing is set for printing of a plurality of images containing large-size characters, it is possible to print the plurality of images on a single printing sheet in view of the size(s) of the characters contained in the images to be printed, and to reduce the consumption of printing sheets.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications may be feasible.

In the aforementioned illustrative embodiment, the eco setting button 136 is displayed on the print execution screen 130. However, instead of the eco setting button 136, a check box may be displayed on the print execution screen 130. In this case, when the print button 137 is operated with the check box selected, the control program 30 may automatically set the print parameters for the plurality of setting items. Further, when receiving a print instruction from an application program different from the control program 30 with the check box selected, the control program 30 may automatically set the print parameters for the plurality of setting items.

In the aforementioned illustrative embodiment, the type of the target image(s) is specified according to the button operated on the image type selection screen 110. However, the type of the target image(s) may be specified in other methods. For instance, the type of the target image(s) may be identified based on an extension of the image data of the target image(s). Specifically, for instance, when the extension is ".jpg" or ".raw," the type of the target image(s) may be identified as the picture image. Further, when the extension is ".docx" or ".xlsx," the type of the target image(s) may be identified as the document image. Further, in another instance, the type of the target image(s) may be identified based on a folder in which the image data of the target image(s) is stored. Specifically, when the image data is stored in a picture folder, a scanned data folder, or a camera folder, the type of the target image(s) may be identified as the picture image. Meanwhile, when the image data is stored in a folder (e.g., a document folder) in which any picture images are not stored, the type of the target image may be identified as the document image. Further, in yet another instance, the image data of the target image(s) may be analyzed, and the type of the target image(s) may be identified based on a result of the analysis. Specifically, as a result of analyzing the image data of the target image(s), when a content rate of text data contained in the image data is equal to or more than a set rate, the type of the target image(s) may be identified as the document image. Meanwhile, when the content rate of the text data contained in the image data is less than a set rate, the type of the target image may be identified as the picture image. Further, in yet another instance, when the control program 30 is configured to transmit a print instruction to the selected device in response to receiving a print instruction from an application program different from the control program 30, the type of the target image may be identified based on the type of the application program. Specifically, when the said application program is a program such as Adobe (registered trademark) Illustrator for forming picture images, the type of the target image(s) may be identified as the picture image. Meanwhile, when the application program is a program such as Microsoft (registered trademark) Office for forming document images, the type of the target image may be identified as the document image.

In the aforementioned illustrative embodiment, the print parameters are automatically set based on the type of the target image(s), the function(s) of the selected device, the size(s) of the characters contained in the target image(s). However, the print parameters may be automatically set based on a source from which the target image(s) have been obtained. Specifically, for instance, an image capture button may be displayed on the LCD 16. In this case, when the image capture button is operated, the control program 30 may obtain image data from a camera and store the obtained image data into a folder for the camera. Further, when the target image(s) are selected from the folder for the camera, the control program 30 may identify the camera as the source of the target image(s). Further, for instance, a copy button may be displayed on the LCD 16. In this case, when the copy button is operated, the control program 30 may obtain image data from an image scanner and store the obtained image data into a folder for the image scanner. Further, when the target image(s) are selected from the folder for the image scanner, the control program 30 may identify the image scanner as the source of the target image(s). Then, for instance, when the source of the target image(s) is the camera, the control program 30 may set the print parameter for the setting item indicating the print color to the color printing, and may set the print parameter for the setting item indicating the printing surface(s) to the simplex printing. Further, for instance, when the source of the target image(s) is the image scanner, the control program 30 may set the print parameter of the setting item indicating the print color to the monochrome printing.

In the aforementioned illustrative embodiment, the control program 30 obtains the function information from the selected device. However, the functional information may be stored in the data storage area 34. In this case, the control program 30 may obtain the function information from the data storage area 34. Specifically, for instance, when a device driver for a device is installed into the PC 10, function information of the device may be stored into the data storage area 34 in association with a device name of the device. Additionally or alternatively, the control program 30 may obtain function information and a device name from a device communicable with the PC 10, and may store the obtained function information into the data storage area 34 in association with the obtained device name. Then, the control program 30 may obtain a device name from the selected device, and may obtain function information associated with the obtained device name from the data storage area 34.

In the aforementioned illustrative embodiment, the size information indicating the size(s) of the characters contained in the target image(s) is employed as the feature information indicating the features of the target image(s). However, information other than the size information may be employed as the feature information. For instance, barcode information indicating whether the target image(s) contain a barcode, and information indicating a content rate of text data contained in the image data of the target image(s) may be employed as the feature information. Then, for instance, when the barcode information indicates that the target image(s) do not contain a barcode, the control program 30 may set the print parameter for the setting item indicating the image layout to the layout printing. Meanwhile, when the barcode information indicates that the target image(s) contain a barcode, the control program 30 may set the print parameter for the setting item indicating the image layout to the normal layout printing. In other words, the layout printing may be set for printing of the target image(s) not containing a barcode, while the normal layout printing may be set for printing of the target image(s) containing a barcode. Thereby, it is possible to ensure that a barcode contained in a target image is properly read even from a printed image of the target image on a printing sheet.

Figure 2:
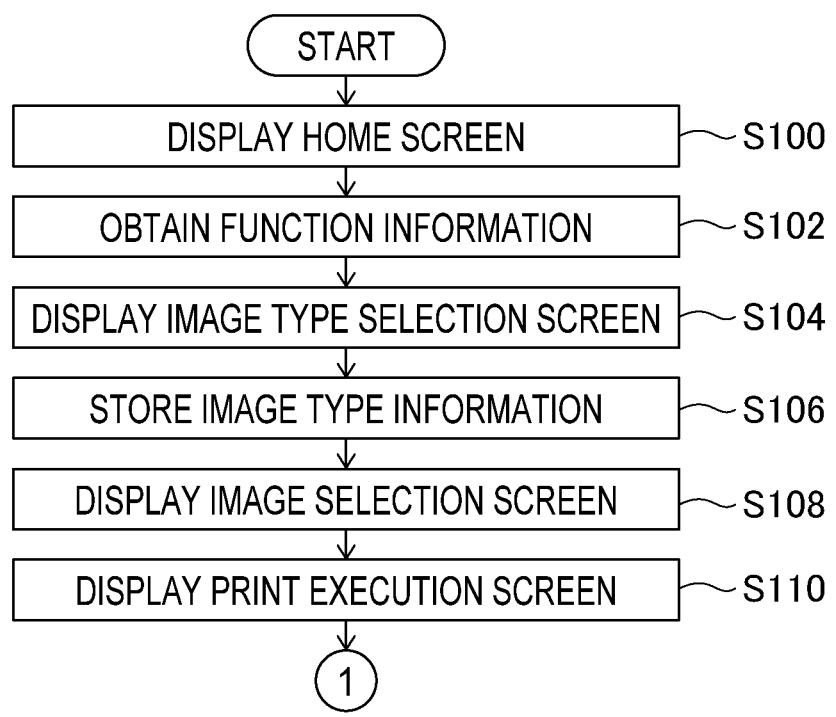
FIGS. 2 to 4 are flowcharts showing a procedure of a process to be performed by a CPU of the PC executing a control program, in the illustrative embodiment according to one or more aspects of the present disclosure.
Figure 3:
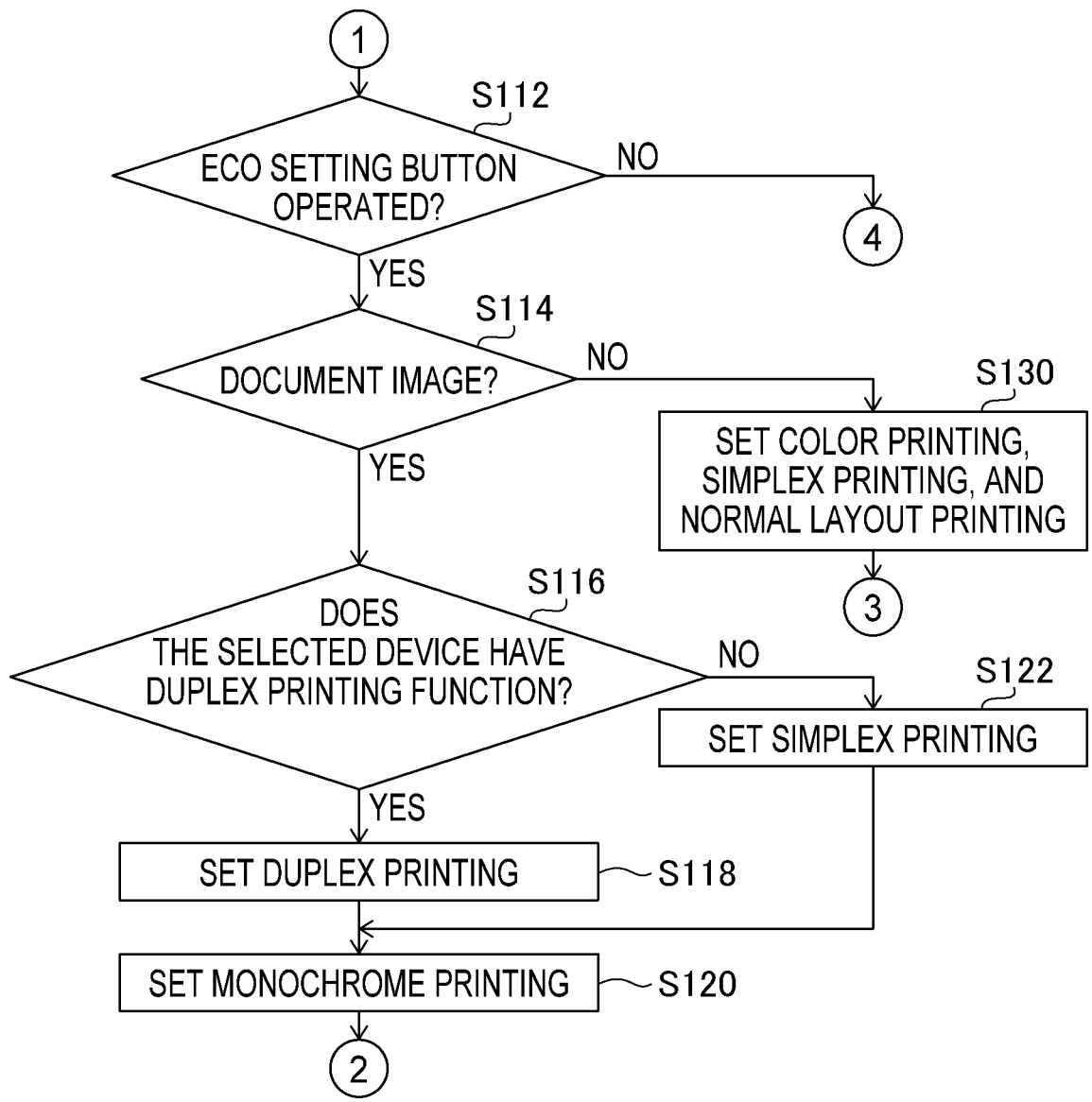
Figure 4:
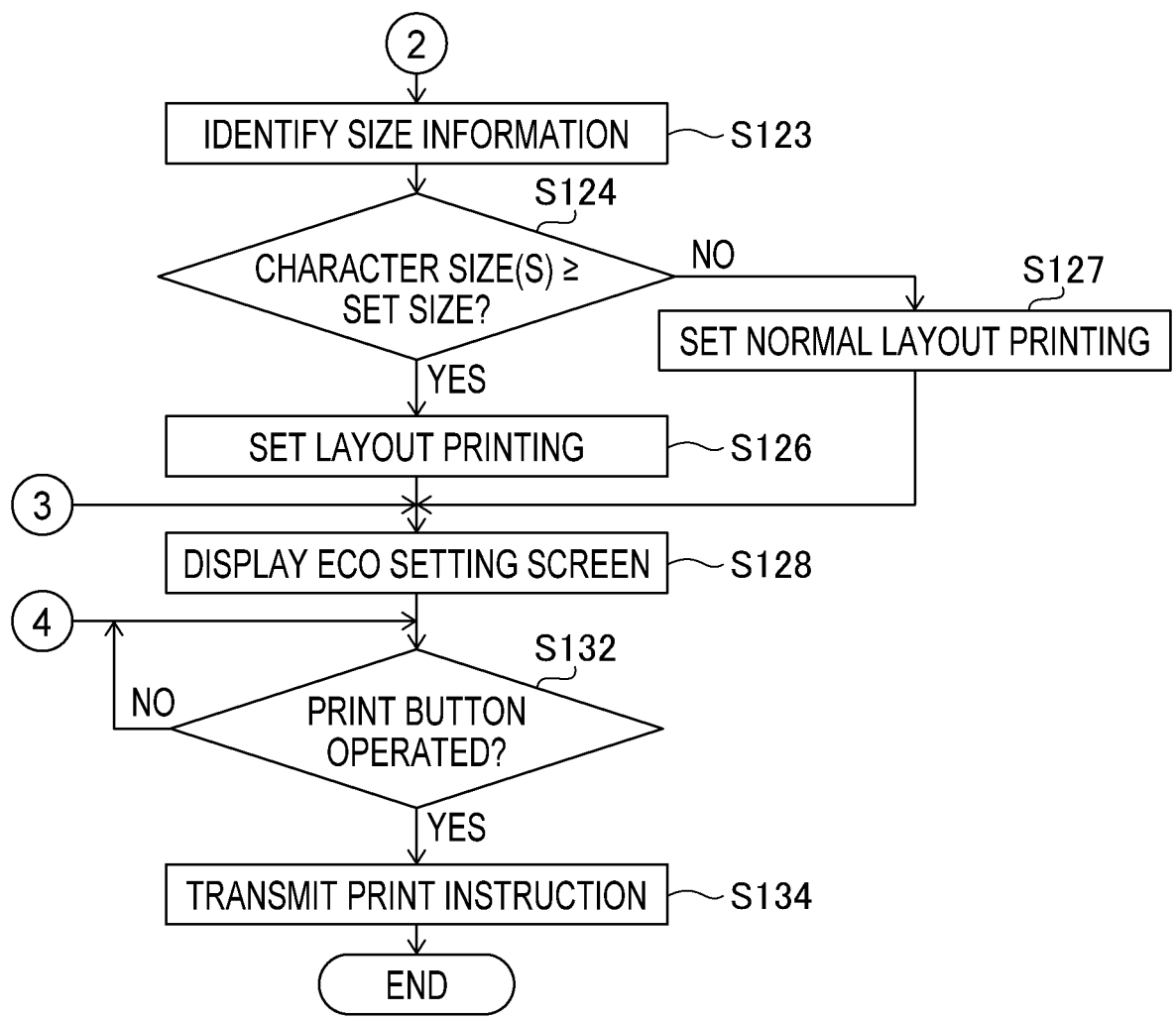

In the aforementioned illustrative embodiment, the processes shown in FIGS. 2 to 4 are performed by the CPU 12 of the PC 10. However, for instance, these processes may be performed by ASICs and/or other logical integrated circuits. In another instance, at least two of CPUs, ASICs, and logical integrated circuits may perform these processes in cooperation with each other.

The following shows examples of associations between elements exemplified in the aforementioned illustrative embodiment and modifications and elements according to aspects of the present disclosure. The PC 10 may be an example of an "information processing device" according to aspects of the present disclosure. The MFPs 50 and 52 may be included in examples of a "target device" according to aspects of the present disclosure. The CPU 12 may be an example of a "processor" of the "information processing device" according to aspects of the present disclosure. The memory 14 storing the control program 30 may be an example of a "non-transitory computer-readable medium" storing "computer-readable instructions" according to aspects of the present disclosure, and may be an example of a "memory" storing "computer-readable instructions" according to aspects of the present disclosure. The CPU 12 and the memory 14 storing the control program 30 may be included in a "controller" according to aspects of the present disclosure. The input I/F 18 may be an example of a "user interface" according to aspects of the present disclosure. The LCD 16 may be an example of a "display" according to aspects of the present disclosure. The communication I/F 20 may be an example of a "communication interface" according to aspects of the present disclosure.

What is claimed is:

1. A non-transitory computer-readable medium storing computer-readable instructions executable by a processor of an information processing device comprising a user interface, the instructions being configured to, when executed by the processor, cause the information processing device to:
   accept via the user interface an operation for performing eco-printing;
   obtain related information on a plurality of setting items for the eco-printing; and
   when accepting the operation for performing the eco-printing, automatically set print parameters for the plurality of setting items for the eco-printing, based on the obtained related information;
   obtain, as the related information, feature information indicating features of one or more target images to be printed;
   automatically set print parameters according to the features of the one or more target images indicated by the obtained feature information, as the print parameters for the plurality of setting items;
   when the one or more target images include a character, obtain information indicating a size of the character as the feature information; and
   when the size of the character indicated by the feature information is equal to or larger than a set size, automatically set a print parameter for a setting item indicating an image layout among the plurality of setting items, to layout printing in which a plurality of images are printable on a single sheet.

2. The non-transitory computer-readable medium according to claim 1, wherein the information processing device further comprises a communication interface, and
   wherein the instructions are further configured to, when executed by the processor, cause the information processing device to, when receiving a print instruction via the user interface, transmit, to a target device via the communication interface, a print execution instruction to cause the target device to perform the eco-printing according to the automatically-set print parameters for the plurality of setting items.

3. The non-transitory computer-readable medium according to claim 1, wherein the information processing device further comprises a display and a communication interface, and
   wherein the instructions are further configured to, when executed by the processor, cause the information processing device to:
   display, on the display, the automatically-set print parameters for the plurality of setting items in such a manner that each of the automatically-set print parameters is changeable by an operation via the user interface; and
   when at least one of the automatically-set print parameters is changed by the operation via the user interface, transmit, to a target device via the communication interface, a print execution instruction to cause the target device to perform the eco-printing according to the print parameters for the plurality of setting items that include the changed at least one print parameter.

4. The non-transitory computer-readable medium according to claim 1, wherein the instructions are further configured to, when executed by the processor, cause the information processing device to:
   obtain, as the related information, image type information indicating a type of the one or more target images to be printed; and
   automatically set print parameters according to the type of the one or more target images indicated by the obtained image type information, as the print parameters for the plurality of setting items.

5. The non-transitory computer-readable medium according to claim 4, wherein the instructions are further configured to, when executed by the processor, cause the information processing device to, when the type of the target images indicated by the image type information is a document image, automatically set a print parameter for a setting item indicating a print color among the plurality of setting items, to monochrome printing.

6. The non-transitory computer-readable medium according to claim 1, wherein the instructions are further configured to, when executed by the processor, cause the information processing device to:
   obtain, as the related information, function information indicating one or more functions of a target device for performing the eco-printing; and
   automatically set print parameters according to the one or more functions of the target device indicated by the obtained function information, as the print parameters for the plurality of setting items.

7. The non-transitory computer-readable medium according to claim 6, wherein the instructions are further configured to, when executed by the processor, cause the information processing device to, when the one or more functions of the target device indicated by the function information include a duplex printing function, automatically set a print parameter for a setting item indicating printing surface(s) among the plurality of setting items, to duplex printing.

8. A non-transitory computer-readable medium storing computer-readable instructions executable by a processor of an information processing device comprising a user interface, the instructions being configured to, when executed by the processor, cause the information processing device to:
   accept via the user interface an operation for performing eco-printing;

obtain related information on a plurality of setting items for the eco-printing;

when accepting the operation for performing the eco-printing, automatically set print parameters for the plurality of setting items for the eco-printing, based on the obtained related information;

obtain, as the related information, source information indicating a source from which the information processing device obtains one or more target images to be printed; and automatically set print parameters according to the source of the one or more target images indicated by the obtained source information, as the print parameters for the plurality of setting items.

9. The non-transitory computer-readable medium according to claim 8, wherein the information processing device further comprises a communication interface, and
wherein the instructions are further configured to, when executed by the processor, cause the information processing device to, when receiving a print instruction via the user interface, transmit, to a target device via the communication interface, a print execution instruction to cause the target device to perform the eco-printing according to the automatically-set print parameters for the plurality of setting items.

10. The non-transitory computer-readable medium according to claim 8, wherein the information processing device further comprises a display and a communication interface, and
wherein the instructions are further configured to, when executed by the processor, cause the information processing device to:
display, on the display, the automatically-set print parameters for the plurality of setting items in such a manner that each of the automatically-set print parameters is changeable by an operation via the user interface; and
when at least one of the automatically-set print parameters is changed by the operation via the user interface, transmit, to a target device via the communication interface, a print execution instruction to cause the target device to perform the eco-printing according to the print parameters for the plurality of setting items that include the changed at least one print parameter.

11. The non-transitory computer-readable medium according to claim 8, wherein the instructions are further configured to, when executed by the processor, cause the information processing device to:
obtain, as the related information, image type information indicating a type of the one or more target images to be printed; and
automatically set print parameters according to the type of the one or more target images indicated by the obtained image type information, as the print parameters for the plurality of setting items.

12. The non-transitory computer-readable medium according to claim 11, wherein the instructions are further configured to, when executed by the processor, cause the information processing device to, when the type of the target images indicated by the image type information is a document image, automatically set a print parameter for a setting item indicating a print color among the plurality of setting items, to monochrome printing.

13. The non-transitory computer-readable medium according to claim 8, wherein the instructions are further configured to, when executed by the processor, cause the information processing device to:
obtain, as the related information, function information indicating one or more functions of a target device for performing the eco-printing; and
automatically set print parameters according to the one or more functions of the target device indicated by the obtained function information, as the print parameters for the plurality of setting items.

14. The non-transitory computer-readable medium according to claim 13, wherein the instructions are further configured to, when executed by the processor, cause the information processing device to, when the one or more functions of the target device indicated by the function information include a duplex printing function, automatically set a print parameter for a setting item indicating printing surface(s) among the plurality of setting items, to duplex printing.

* * * * *